United States Patent [19]

Omata

[11] Patent Number: 4,990,225
[45] Date of Patent: Feb. 5, 1991

[54] METHOD OF MANUFACTURING HIGH MAGNETIC FLUX DENSITY ELECTRODEPOSITED QUATERNARY ALLOY THIN FILM

[75] Inventor: Yuuji Omata, Ibaraki, Japan

[73] Assignee: Matsushita Electric Industrial Co., Ltd., Osaka, Japan

[21] Appl. No.: 511,336

[22] Filed: Apr. 19, 1990

[30] Foreign Application Priority Data

Apr. 28, 1989 [JP] Japan .................... 01-109362

[51] Int. Cl.$^5$ ............................................. C25D 3/56
[52] U.S. Cl. ................................ 204/44; 204/44.5
[58] Field of Search ............................ 204/44, 44.5

[56] References Cited

U.S. PATENT DOCUMENTS

| | | | |
|---|---|---|---|
| 3,374,156 | 3/1968 | Schiffman et al. | 204/44.5 |
| 3,480,522 | 11/1969 | Brownlow | 204/44.5 X |
| 3,533,922 | 10/1970 | Semienko et al. | 204/44.5 |
| 4,673,471 | 6/1987 | Kagechika et al. | 204/44.5 |

FOREIGN PATENT DOCUMENTS

1227753 10/1966 Fed. Rep. of Germany ..... 204/44.5
13747 5/1975 Japan.

*Primary Examiner*—G. L. Kaplan
*Attorney, Agent, or Firm*—Stevens, Davis, Miller & Mosher

[57] ABSTRACT

A method of manufacturing a high magnetic flux density quaternary alloy electrodeposited thin film, comprising the steps of: forming an FeCoNiCr or an FeCoNiCu quaternary alloy thin film on a cathode by using an electrodepositing electrolyte bath to which four types of ions of Fe, Co, Ni and Cr or Cu have been supplied through sulfate and/or hydrochloride, each of which contains bivalent or tervalent Fe, Co, Ni, Cr and Cu ions, by using a bath having on the basis of the density of [Ni$^{2+}$] ion such compositions as $0.02 < [Co^{2+}]/[Ni^{2+}] < 0.9$, $0.095 < [Fe^{2+}]/[Ni^{2+}] < 0.4$ and $0.075 < [Cr^{3+}]/[Ni^{2+}] < 0.4$, or $0.001 < [Cu^{2+}]/[Ni^{2+}] < 0.03$; and arranging electrodeposition current density J to be in a range of J<60 (mA/cm$^2$) at the cathode.

4 Claims, 2 Drawing Sheets

Fe-Co-Ni-Cu ALLOY IN THE CASE OF THE BATH COMPOSITION No. 11 OF TABLE 1

METHOD OF MANUFACTURING HIGH MAGNETIC FLUX DENSITY ELECTRODEPOSITED QUATERNARY ALLOY THIN FILM

BACKGROUND OF THE INVENTION

1. Field of the Invention

The present invention relates to a method of manufacturing a high saturation magnetic flux density alloy thin film for use in a magnetic head for reproducing high density magnetic recording.

2. Description of the Related Art

The material of magnetic heads must have high saturated magnetic flux density (Bs) so as to be suitable for use with a recording medium having large coercive force (Hc) required for performing high density magnetic recording. However, only an Ni-Fe alloy (permalloy) of Bs=about 9000 Gauss has heretofore been available as a soft magnetic material having high Bs value for use in a thin film magnetic head that can be manufactured by an electrodepositing method through a low temperature process with an excellent pattern accuracy. However, in order to improve the magnetic recording reproducing efficiency, a thin film has been desired which has a larger Bs Value, which also exhibits excellent soft magnetic characteristics, and which can be manufactured by the electrodeposition method so as to obtain advantages similar to those of the permalloy film.

An Fe-Co-Ni ternary alloy thin film has an excellent Bs value: Bs=10000−21000 Gauss, and excellent soft magnetic properties. However, it has the smallest coercive force (hc) among alloy compositions having a stable face-centered cubic structure at room temperature. The magnitude of magnetostriction in the vicinity (Bs=18 kG) of $Fe_{45}Co_{20}Ni_{35}$ at which the highest magnetic permeability exists becomes $+1 \times 10^{-5} > 0$ which is a large absolute value. Therefore, the absolute value of the magnitude of the magnetostriction must be reduced by adding a fourth component.

However, the conditions for manufacturing a quaternary alloy whose main components are Fe, Co and Ni by the electrodeposition method have not been found as yet because the electrode potentials of the component ions at the cathode differ from one another.

SUMMARY OF THE INVENTION

An object of the present invention is to overcome the above-described conventional problem.

A method of manufacturing a high magnetic flux density alloy thin film according to the present invention is characterized by electrodepositing quaternary alloy consisting or FeCoNiCr or FeCoNiCu to a cathode at an electrodeposition current density of $J < 60$ [mA/cm$^2$] in an electrodepositing bath to which $Fe^{2+}$, $Co^{2+}$, $Ni^{2+}$, $Cr^{3+}$ and $Cu^{2+}$ ions have been supplied by sulphate and hydrochloride in such a manner that the proportion of the ion densities in the bath is $0.02 < [Co^{2+}]/[Ni^{2+}] < 9.9$,
$0.095 < [Fe^{2+}]/[Ni^{2+}] < 0.4$ and
$0.075 < [Cr^{3+}]/[Ni^{2+}] < 0.4$, or
$0.001 < [Cu^{2+}]/[Ni^{2+}] < 0.03$.

According to the above-described steps, the $Fe^{2+}$, $Co^{2+}$, $Ni^{2+}$, $Cr^{3+}$ and $Cu^{2+}$ ions in the bath can be stably supplied to the cathode electrode in the above-described ranges that $0.02 < [Co^{2+}]/[Ni^{2+}]$, $0.095 < [Fe^{2+}]/[Ni^{2+}]$, $0.075 < [Cr^{3+}]/[Ni^{2+}]$ and $0.001 < [Cu^{2+}]/[Ni^{2+}]$, and a stable FeCoNiCr or FeCoNiCu quaternary alloy electrodeposited film can be obtained in the above-described ranges that $[Co^{2+}]/[Ni^{2+}] < 0.9$, $[Fe^{2+}]/[Ni^{2+}] < 0.4$, $[Cr^{3+}]/[Ni^{2+}] < 0.4$ and $[Cu^{2+}]/[Ni^{2+}] < 0.03$. In electrodeposition using the same bath composition, the film composition can be successively changed in the electrodeposition current density range of $J < 60$ [mA/cm$^2$], and an excellent surface quality can be also obtained. The quaternary alloy electrodeposited film was obtained when the range of a pH value of the bath was $1.5 < pH < 5.0$. As for the temperature condition for the electrodeposition, an FeCoNiCr (or FeCoNiCu) quaternary soft magnetic high saturated magnetic flux density film was obtained in the temperature range of at least from 20° to 60 °C.

As the material for the cathode electrode, both an FeCoNi ternary evaporated film having the composition which is similar to that of the electrodeposited film and a permalloy (an NiFe film) evaporated film were used, resulting in no significant difference.

Furthermore, additions of sodium saccharate and sodium lauryl sulfate by 3 g/l or less and 1 g/l or less, respectively and boric acid by 1 mol/l to the electrodeposited film cause its internal stress to be relieved, causes the surface quality of the film to be improved and causes the pH value of the bath to be stabilized.

Another object of the invention is to provide a method of manufacturing a high magnetic flux density quaternary alloy electrodeposited thin film wherein a ternary FeCoNi thin film or a permalloy thin film obtained by evaporation is used as a material for a cathode electrode for the electrodeposition.

Other and further objects, features and advantages of the invention will be appear more fully from the following description.

DESCRIPTION OF THE PREFERRED EMBODIMENT

Figure 1:
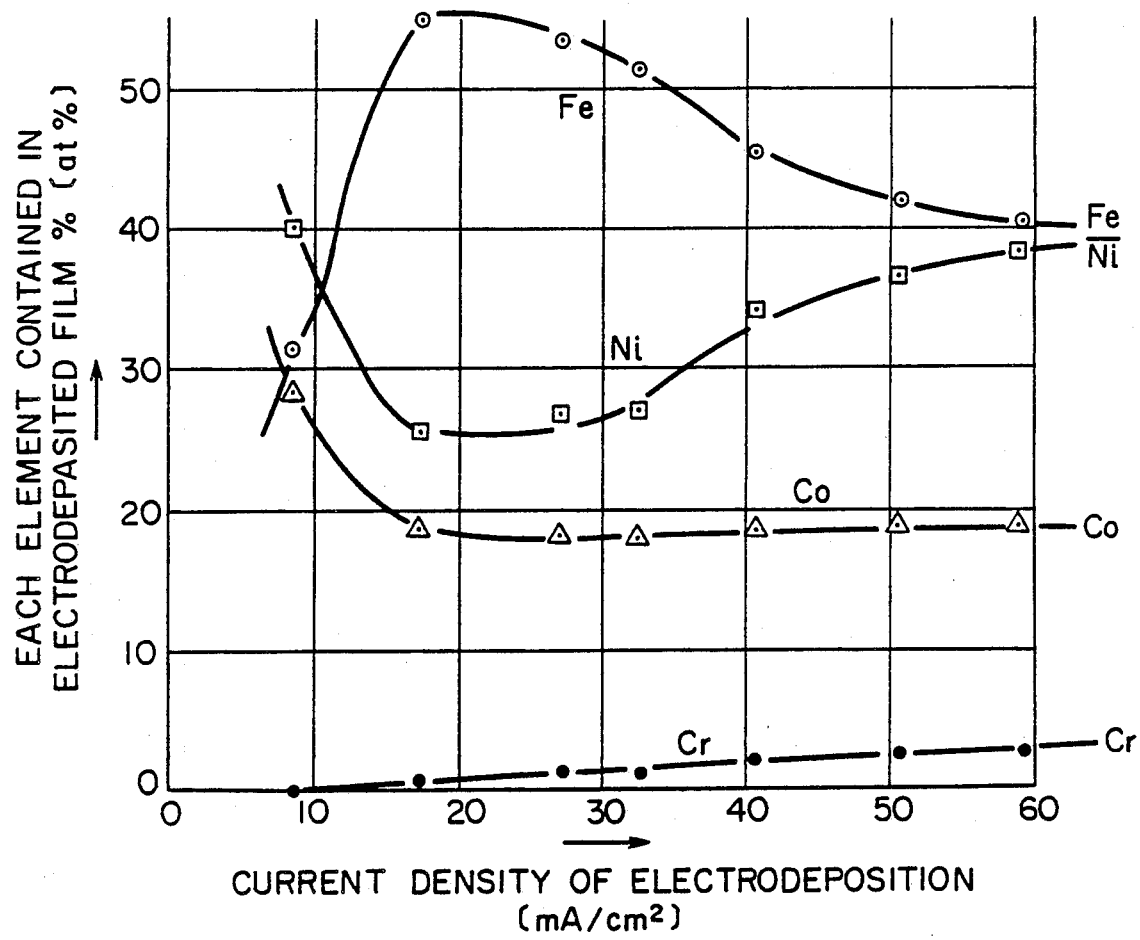
FIG. 1 is a graph which illustrates J (electrodeposition current density)-dependency of the film composition of an FeCoNiCr high magnetic flux density quaternary alloy electrodeposited thin film manufactured by a method according to an embodiment of the present invention.

Preferred embodiments of the present invention will now be described with reference to the drawings.

The conditions for electrodeposition of an FeCoNiCr quaternary alloy such as on density ratio of the components in the electrodeposition bath, the pH value and temperature of the electrodeposition bath, the materials of the electrodes, the additives and the compositions of the film are shown in Table 1.

TABLE 1

| Bath No. | [Co²⁺]/[Ni²⁺] | [Fe²⁺]/[Ni²⁺] | [Cr³⁺]/[Ni²⁺] | [Cu²⁺]/[Ni²⁺] | pH & Temperature [°C.] | Electrode | Film Composition [at %] Fe | Co | Ni | Cr | Cu |
|---|---|---|---|---|---|---|---|---|---|---|---|
| 1 | 0.030 | 0.184 | 0.188 | | 2.4 50° C. | NiFe | 45.3 | 18.6 | 34.1 | 2.1 | |
| 2 | 0.059 | 0.125 | 0.210 | | 2.4 50° C. | " | 45.2 | 18.6 | 34.1 | 2.1 | |
| 3 | 0.030 | 0.186 | 0.237 | | 2.4 50° C. | " | 45.0 | 8.8 | 43.8 | 2.4 | |
| 4 | 0.060 | 0.113 | 0.210 | | 2.4 50° C. | " | 41.2 | 18.5 | 37.9 | 2.4 | |
| 5 | 0.065 | 0.386 | 0.326 | | 2.4 50° C. | " | 49.6 | 14.8 | 35.0 | 0.6 | |
| 6 | 0.065 | 0.386 | 0.150 | | 2.4 50° C. | " | 36.2 | 17.7 | 45.8 | 0.3 | |
| 7 | 0.020 | 0.095 | 0.075 | | 2.4 50° C. | " | 31.5 | 6.2 | 61.2 | 1.1 | |
| 8 | 0.030 | 0.184 | 0.188 | | 4.7 50° C. | " | 37.0 | 17.1 | 33.9 | 2.0 | |
| 9 | 0.030 | 0.184 | 0.188 | | 1.8 50° C. | " | 41.1 | 16.9 | 39.5 | 2.2 | |
| 10 | 0.034 | 0.185 | | 0.0013 | 2.4 50° C. | " | 44.2 | 14.7 | 37.3 | | 3.9 |
| 11 | 0.047 | 0.185 | | 0.0013 | 2.4 50° C. | " | 46.9 | 18.6 | 30.7 | | 3.8 |
| 12 | 0.062 | 0.386 | | 0.0019 | 2.4 50° C. | " | 55.0 | 14.9 | 24.7 | | 5.3 |
| 13 | 0.062 | 0.386 | | 0.0043 | 2.4 50° C. | " | 40.5 | 16.5 | 34.4 | | 0.6 |
| 14 | 0.062 | 0.386 | | 0.0132 | 2.4 50° C. | " | 29.4 | 14.2 | 26.0 | | 29.4 |
| 15 | 0.062 | 0.386 | | 0.0263 | 2.4 50° C. | " | 6.7 | 6.1 | 19.1 | | 66.9 |

Note
Nos. 1 to 9: quaternary alloys containing Cr (J = 40 mA/cm² constant)
Nos 10 to 15: quaternary alloys containing Cu (J = 8 mA/cm² constant)
Nos. 1 to 4, 10 and 11: Only sulfate was used.
Nos. 7 and 12: Only hydrochloride was used.
Nos. 5, 6, 8, 13, 14 and 15: Both sulfate and hydrochloride were used.

All of the above-described quaternary alloys had high saturated magnetic flux density of Bs > 10000 Gauss.

The change in the composition of the quaternary alloy, coercive force Hc and the saturated magnetic flux density Bs in the case where the electrodeposition current density was changed in the same bath composition are shown in Table 2 (regarding the composition of the bath and the electrodeposition conditions for the quaternary alloy containing Cr there were used those of No. 1 in table 1 and regarding those for the quaternary alloy containing Cu there were used No. 11).

(When evaluating the ionic mole ratios of the baths of Table 1, the electrodeposition current density J was set for the quaternary alloy containing Cr so that J is a constant value Of 40 mA/cm², for the quaternary alloy containing Cu so that J is another constant value of 8 mA/cm², and other electrodeposition conditions were as shown in Table 1).

Furthermore, it has been confirmed that the film composition can be successively changed when the electrodeposition current density is in a range of J < 60 (mA/cm²) in the electrodeposition shown in Table 2 in which the same bath compositions as, for example, the

TABLE 2

| | Current Density [mA/cm²] | Fe [at %] | Co [at %] | Ni [at %] | Cr [at %] | Cu [at %] | Hc [Oe] | Bs [k Gauss] |
|---|---|---|---|---|---|---|---|---|
| A | 8.6 | 31.3 | 38.4 | 40.0 | 0.2 | | 6.5 | 16.1 kG |
| B | 17.3 | 54.9 | 18.8 | 25.6 | 0.7 | | 2.0 | 19.4 kG |
| C | 26.8 | 53.4 | 18.5 | 26.8 | 1.3 | | 1.5 | 18.8 kG |
| D | 32.5 | 51.4 | 17.9 | 26.9 | 1.2 | | 1.3 | 18.1 kG |
| E | 40.4 | 45.3 | 18.6 | 34.1 | 2.1 | | 1.0 | 16.8 kG |
| F | 50.5 | 42.0 | 18.9 | 36.8 | 2.3 | | 1.2 | 16.6 kG |
| G | 59.1 | 40.3 | 18.8 | 38.3 | 2.6 | | 1.4 | 15.8 kG |
| H | 4.0 | 33.2 | 21.2 | 38.9 | | 6.7 | 8.0 | 13.4 kG |
| I | 8.0 | 46.9 | 18.6 | 30.7 | | 3.8 | 5.0 | 14.2 kG |
| J | 12.0 | 57.8 | 14.4 | 26.1 | | 1.7 | 3.2 | 17.7 kG |
| K | 20.0 | 63.0 | 12.1 | 23.5 | | 1.3 | 2.3 | 18.2 kG |
| L | 27.0 | 61.8 | 11.9 | 25.5 | | 0.8 | 1.8 | 17.9 kG |
| M | 35.0 | 61.2 | 11.7 | 26.4 | | 0.7 | 1.5 | 18.0 kG |

A-G (quaternary alloys containing Cr); bath and electrodeposition conditions are the same as those of No. 1 (quaternary containing Cr) shown in Table 1.
H-M (quaternary alloys containing Cu); bath and electrodeposition conditions are the same as those of No. 11 shown in Table 1.

According to the evaluation of quaternary alloys obtained from the electrodeposition baths shown in Table 1 and supplied with the ions in the form of sulfate and hydrochloride, stable FeCoNiCr and FeCoNiCu quaternary alloy electrodeposited films were obtained in the following cases on the basis of an [Ni²⁺] ion which was the highest ion density in each of the baths:

$$[Fe^{2+}]/[Ni^{2+}] < 0.4$$
$$[Co^{2+}]/[Ni^{2+}] < 0.9 \text{ and}$$
$$[Cr^{3+}]/[Ni^{2+}] < 0.4 \text{ or}$$
$$[Cu^{2+}]/[Ni^{2+}] < 0.03$$

baths No. 1 and No. 11 shown in Table 1 were used.

Figure 2:
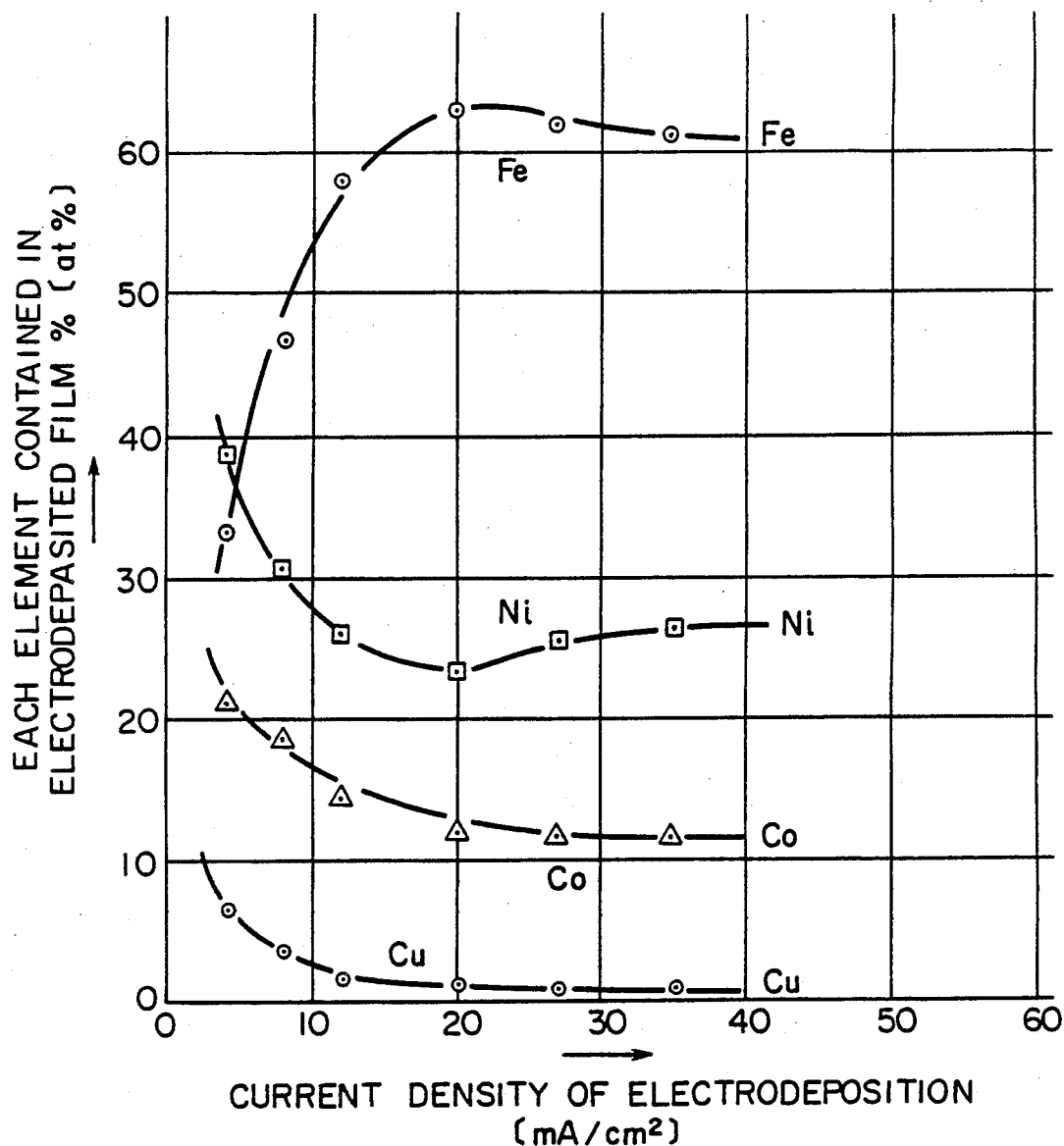
FIG. 2 is a graph which illustrates J-dependency of the film composition of an FeCoNiCu high magnetic flux density quaternary alloy electrodeposited thin film manufactured by a method according to an embodiment of the present invention.

FIGS. 1 and 2 respectively show the result of the evaluation of the FeCoNiCr alloys and that of the FeCoNiCu alloys shown in Table 2 with respect to the relationship between the electrodeposition current density and each constituent of the film.

FIG. 1 illustrates J-dependency of the film composition of the FeCoNiCr alloy when the electrodeposition current density was changed in the range of J < 60 mA/cm² by using the bath composition No. 1 shown in Table 1. FIG. 2 illustrates the J-dependency of the same of the FeCoNiCu alloy when that was changed similarly by using the bath composition No. 11 shown in Table 1.

As shown in the embodiments (the electrodeposition current density dependency) shown in Table 2, the quaternary alloy electrodeposited films having relatively small coercive force Hc was obtained and each of which showed high saturated magnetic flux density exceeding 10000 Gauss.

Particularly, the magnitude of magnetostriction of the FeCoNiCr quaternary alloy film was a positive value not more than $1 \times 10^{-5}$, which value was smaller than that of a ternary alloy film having the same Bs value.

As is shown from Table 1, it was confirmed that a quaternary alloy electrodeposited film could be obtained when the pH value was in a relatively broad acid range of $1.5 < pH < 5.0$.

In order to stably supply the ions in the bath to the cathode so as to obtain a quaternary alloy electrodeposited film having the stable composition, the density of each of the ions must be maintained at a certain level. Satisfactory results were obtained, in judging from Table 1, in the following range with respect to the $[Ni^{2+}]$ ion density:

$$0.02 < [Co^{2+}]/[Ni^{2+}]$$
$$0.095 < [Fe^{2+}]/[Ni^{2+}] \text{ and}$$
$$0.075 < [Cr^{3+}]/[Ni^{2+}] \text{ or}$$
$$0.001 < [Cu^{2+}]/[Ni^{2+}]$$

Furthermore, it has been confirmed from the embodiments shown in Table 1 that the use of sodium saccharate, sodium lauryl sulfate and boric acid, which have been used in prior art electrodeposition methods, is effective to relieve stress, to improve the surface quality of the film and to stabilize the pH value in the quaternary alloy electrodeposition, where the quantities of the additives were 3 g/l, 1 g/l and 1 mol/l, respectively).

Regarding the kind of the material for the cathode electrode, both an FeCoNi film having the composition which is similar to that of the electrodeposited film and an NiFe film (a permalloy film) were used, resulting in no significant difference.

It is also within the scope of the invention to use a ternary FeCoNi thin film or a permalloy thin film obtained by evaporation as the material for the cathode electrode for the electrodeposition.

The electrodepositing temperature ranging from 20° to 60° C. was also evaluated, resulting in that an FeCoNiCu alloy soft magnetic film having high saturated magnetic flux density was obtained under proper electrodepositing conditions in the above-described temperature range. It is effective to improve the soft magnetic characteristics by adopting a manufacturing method comprising the steps of performing electrodeposition in a magnetic field fixed in the vicinity of the cathode so that uniaxial anisotropy is induced to the magnetic film.

As described above, according to the present invention, a quaternary alloy Fe-Co-Ni-X (where X=Cr or Cu) having an remarkably large Bs value can be electrodeposited and a soft magnetic thin film for a thin film magnetic head having satisfactory magnetic record reproducing efficiency can be manufactured by the thus realized electrodeposition method.

Although the invention has been described in its preferred form, it is understood that the present disclosure of the preferred form may been changed in the details of construction and the constitution of the invention may be varied without departing from the spirit and the scope of the invention as hereinafter claimed.

What is claimed is:

1. A method of manufacturing a high magnetic flux density quaternary alloy electrodeposited thin film, comprising the steps of:

forming an FeCoNiCr or an FeCoNiCu quaternary alloy thin film on a cathode by using an electrodepositing electrolyte bath to which four kinds of ions of Fe, Co, Ni and Cr or Cu have been supplied through sulfate and/or hydrochloride, each of which contains bivalent or tervalent Fe, Co, Ni, and Cr or Cu ions, by using a bath having on the basis of the density of $[Ni^{2+}]$ ion such compositions as $$0.02 < [Co^{2+}]/[Ni^{2+}] < 0.9,$$
$$0.095 < [Fe^{2+}]/[Ni^{2+}] < 0.4 \text{ and}$$
$$0.075 < [Cr^{3+}]/[Ni^{2+}] < 0.4, \text{ or}$$
$$0.001 < [Cu^{2+}]/[Ni^{2+}] < 0.03;$$

and setting electrodeposition current density J to be in a range of $J < 60$ (mA/cm$^2$) at said cathode.

2. A method of manufacturing a high magnetic flux density quaternary alloy electrodeposited thin film according to claim 1, wherein said electrodeposition is performed in such a manner that uniaxial anisotropy is induced to said film by a magnetic field fixed in the vicinity of said cathode in said electrodepositing bath.

3. A method of manufacturing a high magnetic flux density quaternary alloy electrodeposited thin film according to claim 1, wherein a ternary FeCoNi thin film or a permalloy thin film obtained by evaporation is used as a material for said cathode electrode for said electrodeposition.

4. A method of manufacturing a high magnetic flux density quaternary alloy electrodeposited thin film according to claim 1, wherein the pH value of said electrodepositing bath is $1.5 < pH < 5.0$.

* * * * *